No. 794,300. PATENTED JULY 11, 1905.
G. W. HOLLISTER.
CORN SHOCKER.
APPLICATION FILED AUG. 13, 1904.
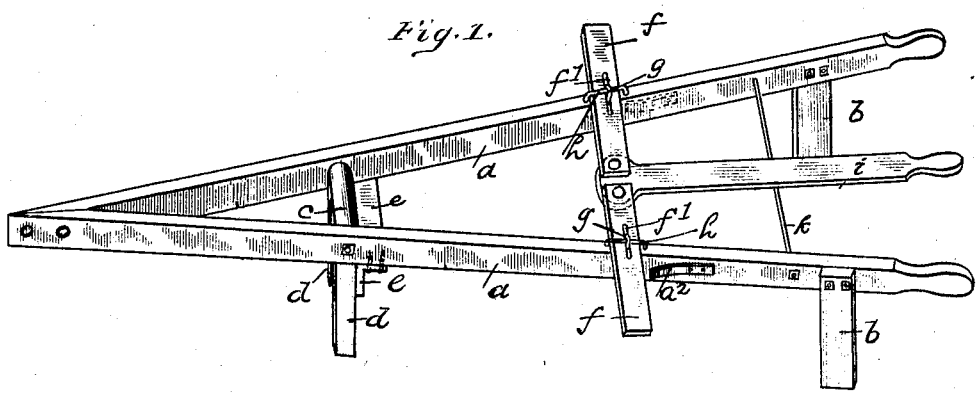
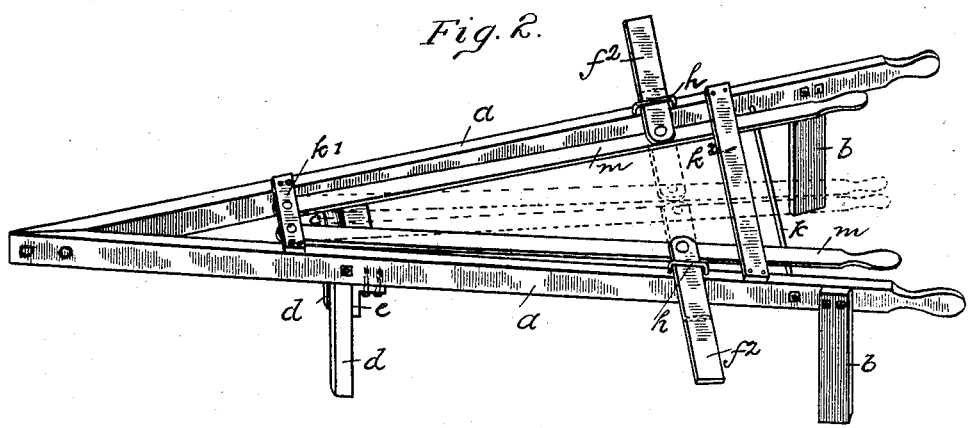
Witnesses:
John Braunwalder
M. A. Milord
Inventor:
George W. Hollister
By Frederick Benjamin
Atty.

No. 794,300. Patented July 11, 1905.

UNITED STATES PATENT OFFICE.

GEORGE W. HOLLISTER, OF CRESCO, IOWA.

CORN-SHOCKER.

SPECIFICATION forming part of Letters Patent No. 794,300, dated July 11, 1905.

Application filed August 13, 1904. Serial No. 220,606.

*To all whom it may concern:*

Be it known that I, GEORGE W. HOLLISTER, a citizen of the United States, residing at Cresco, in the county of Howard and State of Iowa, have invented certain new and useful Improvements in Corn-Shockers, of which the following is a specification.

This invention relates to improvements in appliances or implements designed for use in shocking corn; and the especial objects of my improvements are to provide an implement that can be cheaply made, will be easy to handle, and that will effectively support the stalks of corn until they are tied into shocks.

In the accompanying drawings, which form a part of this application, I have shown a preferred and a modified form of my invention, both, however, representing the same principles and the same general functions.

In said drawings, Figure 1 is a perspective view of the preferred form of my invention, and Fig. 2 is a similar view of the modified form.

Referring to the details of the drawings, $a$ $a$ represent two timbers of suitable dimensions forming side pieces which are bolted together at one end and have their opposite ends unconnected and spaced apart, thus forming a wedge-shape frame. Near their free ends the side pieces have rigidly bolted thereto vertical legs $b$ $b$ of sufficient length to raise the side pieces to a height suitable for the proper handling of the implement. Near their connected ends a spacing-bar $c$ is bolted between the side pieces, and on this bar are pivoted the legs $d$ $d$, so that they may swing toward the extreme forward or pointed end of the frame. To prevent the legs from swinging toward the rear or handle end of the frame, I bolt to the under side of the pieces $a$ $a$ and at the rear of the legs the angle-iron $e$, so that one flange of same bears against the legs when the latter are in an upright position. Instead of using two legs inclined inwardly to permit them to fold between the side pieces I may use only one leg and arrange it in the center of the bar $c$. The construction described is applicable to both forms of my invention.

In Fig. 1 I have shown two arms $f$ $f$, provided with slots $f'$, through which extend eye-bolts $g$ $g$, which are screwed into the upper side of the pieces $a$ $a$, thus pivoting the arms on said pieces so that they may be turned in a horizontal plane and also drawn inwardly and pushed outwardly relative to the frame. To hold the arms loosely to the side pieces, I provide staples $h$ $h$, which pass through the eye of the bolts $g$ $g$ and have their ends driven into the upper edge of the side pieces. It will be understood that these staples are long enough to permit the turning of the arms horizontally to the extent that may be required when the implement is to be withdrawn from a shock of corn. To prevent the arms from turning toward the rear of the frame while the cornstalks are being placed in position, I secure to the outer sides of the pieces $a$ $a$ cleats $a^2$, the free ends of which extend outwardly and abut against the arms when the latter are pressed rearwardly. These cleats also serve to prevent the stalks from becoming wedged between the side pieces and the arms, and thus facilitate the withdrawal of the implement from the shock.

Pivoted to the inner ends of the arms $f$ is a lever $i$, the free end of which is formed for grasping by the hand. About midway of its length the lever rests upon a rod $k$, which extends across the frame and connects the side pieces. It will be apparent that by drawing the lever rearwardly the connected ends of the arms $f$ will be drawn rearwardly, thus throwing their free ends toward the forward end of the implement and permitting the latter to be withdrawn from the shock. When the arms are arranged transversely of the frame or side pieces, they afford a support for the stalks, which are placed against the implement in a manner well understood.

In the construction shown in Fig. 2 instead of using a single lever and pivoting the arms on the side pieces I use two levers, as $m$ $m$, and pivot them at their forward ends to a cross-brace $k'$, which is bolted to the side pieces near the forward end of the frame. To each lever is pivoted a cross-arm $f^2$, which is held loosely to the side pieces $a$ by staples $h$, but is not slotted. In this construction by drawing the levers together the arms $f^2$ are drawn inwardly toward the center of the frame and the reverse movement of the levers extends the arms outwardly into their operative position, as shown in Fig. 2. A cross-brace $k^2$ holds the levers in place.

Having thus described my invention, what I claim as new, and desire to secure by Letters Patent, is—

1. A corn-shocking implement consisting of side pieces rigidly secured together to form a wedge-shape frame and supported by pivoted legs at their forward end and rigid legs at their rearward end, cross-arms adjustably mounted on said side pieces, means for loosely securing said cross-arms to said side pieces, and a lever secured to said cross-arms and adapted to adjust same relative to said side pieces.

2. A corn-shocking implement consisting of side pieces rigidly secured together and braced to form a wedge-shape frame, handles integral with said side pieces, supporting-legs secured to said side pieces, cross-arms mounted on said side pieces and slidably adjustable relative thereto and means for adjusting said arms, said means pivotally connected with said arms and adapted to slide the arms in their bearings on the side pieces.

In testimony whereof I affix my signature in presence of two witnesses.

GEORGE W. HOLLISTER.

Witnesses:
E. P. FARNSWORTH,
JOHN FARNSWORTH.